(12) United States Patent
Barden et al.

(10) Patent No.: US 8,360,476 B2
(45) Date of Patent: Jan. 29, 2013

(54) VEHICULAR CLIMATE CONTROL SYSTEM

(75) Inventors: Adam Barden, Farmington, MI (US); Charles Thrift, Farmington Hills, MI (US); Jason Zech, St. Clair Shores, MI (US)

(73) Assignee: TI Group Automotive Systems, LLC, Auburn Hills, MI (US)

( * ) Notice: Subject to any disclaimer, the term of this patent is extended or adjusted under 35 U.S.C. 154(b) by 594 days.

(21) Appl. No.: 12/548,652

(22) Filed: Aug. 27, 2009

(65) Prior Publication Data

US 2010/0116480 A1    May 13, 2010

Related U.S. Application Data

(60) Provisional application No. 61/092,925, filed on Aug. 29, 2008.

(51) Int. Cl.
*F16L 41/00* (2006.01)

(52) U.S. Cl. .................. 285/197; 185/124.2; 185/124.4; 185/189

(58) Field of Classification Search ............ 138/145, 138/112; 285/124.1, 124.3, 124.4, 197, 21.2, 285/130.1, 133.11, 382.5, 423, 189
See application file for complete search history.

(56) References Cited

U.S. PATENT DOCUMENTS

| | | | | |
|---|---|---|---|---|
| 1,908,821 | A | * | 5/1933 | Cornell, Jr. .................. 285/197 |
| 2,736,335 | A | * | 2/1956 | Webber ........................ 285/197 |
| 3,270,966 | A | * | 9/1966 | Ackley ......................... 285/191 |
| 3,918,748 | A |   | 11/1975 | Acda |
| 4,146,254 | A |   | 3/1979 | Turner et al. |
| 4,722,560 | A |   | 2/1988 | Guest |
| 4,894,521 | A | * | 1/1990 | Evans .......................... 285/21.2 |
| 5,071,172 | A |   | 12/1991 | Gross |
| 5,092,634 | A | * | 3/1992 | Miller ......................... 285/382.5 |
| 5,125,431 | A | * | 6/1992 | Vogel et al. .................... 285/197 |
| 5,180,005 | A | * | 1/1993 | Marsais et al. ................. 285/93 |
| 5,366,253 | A | * | 11/1994 | Nakashiba et al. ........... 285/21.2 |
| 5,375,889 | A | * | 12/1994 | Nakashiba et al. ........... 285/21.2 |
| 5,388,869 | A | * | 2/1995 | Suzuki et al. .................. 285/197 |
| 5,462,313 | A |   | 10/1995 | Rea et al. |
| 5,573,279 | A |   | 11/1996 | Rea et al. |
| 5,788,414 | A | * | 8/1998 | Gordon ........................ 285/197 |
| 5,849,382 | A |   | 12/1998 | Schneck |
| 5,951,062 | A | * | 9/1999 | Miller .......................... 285/197 |
| 5,988,199 | A | * | 11/1999 | Ryan et al. .................... 285/197 |
| 6,000,436 | A | * | 12/1999 | Auvil et al. ................... 285/21.1 |
| 6,199,916 | B1 |   | 3/2001 | Klinger et al. |
| 6,250,687 | B1 | * | 6/2001 | Voigt ............................ 285/197 |
| 6,318,764 | B1 |   | 11/2001 | Trede et al. |
| 6,367,850 | B1 |   | 4/2002 | Thrift et al. |

(Continued)

FOREIGN PATENT DOCUMENTS

| | | |
|---|---|---|
| CN | 1630594 A | 6/2005 |
| WO | WO 03/018373 A1 | 3/2003 |

OTHER PUBLICATIONS

International Search Report, PCT/US2009/055126, mailed Oct. 15, 2009, 2 pages.

(Continued)

*Primary Examiner* — David E Bochna (74) *Attorney, Agent, or Firm* — Leydig, Voit & Mayer, Ltd.

(57) ABSTRACT

An underbody assembly for a vehicular climate control system is disclosed including fluid flow conduits formed of steel coated with polymeric material such as nylon 12. The conduits are continuous between opposite ends free of joints or flexible connection. In one form, the conduit includes branches or connectors formed of polymeric material sealed to the outer polymeric layer of the tube.

20 Claims, 8 Drawing Sheets

U.S. PATENT DOCUMENTS

| | | |
|---|---|---|
| 6,422,396 B1 | 7/2002 | Li et al. |
| 6,488,314 B1 * | 12/2002 | Hutter .................. 285/124.2 |
| 6,832,785 B1 * | 12/2004 | Zitkovic, Jr. ............ 285/21.1 |
| 6,866,300 B2 * | 3/2005 | Hayes et al. ............ 285/124.3 |
| 6,902,208 B1 | 6/2005 | Mobley et al. |
| 7,032,500 B1 * | 4/2006 | Sinclair et al. .......... 285/124.3 |
| 7,263,975 B2 * | 9/2007 | Stieler et al. ................ 123/456 |
| 2004/0021318 A1 | 2/2004 | Fritze et al. |
| 2005/0031894 A1 * | 2/2005 | Klos et al. ................ 138/145 |
| 2006/0163243 A1 | 7/2006 | Stieler et al. |
| 2007/0095467 A1 | 5/2007 | Stieler et al. |

OTHER PUBLICATIONS

Written Opinion, PCT/US2009/055126, mailed Oct. 15, 2009, 7 pages.

Notification of First Office Action; State Intellectual Property Office of P.R. China; May 21, 2012.

English Translation of the Substantial Part of the First Office Action Text.

* cited by examiner

VEHICULAR CLIMATE CONTROL SYSTEM

CROSS-REFERENCE TO RELATED APPLICATIONS

This patent application claims the benefit of U.S. Provisional Patent Application No. 61/092,925, filed Aug. 29, 2008, which is incorporated herein in its entirety by reference.

BACKGROUND OF THE INVENTION

This invention relates to vehicular climate control systems. More particularly, it relates to such systems having cooling or heating fluid conduits comprising steel tubing.

Climate control heating or air conditioning systems for vehicles, particularly automotive vehicles, include components remote from each other necessitating use of long runs of tubing or conduit to complete the system. In an air conditioning system, the compressor, for example, is located in the engine compartment, as is the accumulator. The condenser is usually located at the front of the vehicle forward of the radiator and one or more evaporators are located in the passenger compartment. Similarly, fluid conduits for passenger compartment heating carry heated liquid between the heat sources usually the engine cooling liquid, and heat exchangers in the passenger compartment.

In certain vehicles, such as SUV and vans, the fluid lines extend from the engine compartment to behind the rear wheels. In these instances, the connecting fluid lines are several feet in length.

Assembly procedures dictate that the system's tubing be bundled into connected groups for installation as a sub-assembly referred to as the underbody assembly. It comprises a plurality of tubes of aluminum, of at least two different diameters, secured to mounting blocks made of metal or plastic. The free ends of the tube include coupling blocks for connections to the system components. One or more access ports to receive valves or sensors or to otherwise access the fluid within the system are secured to the tubes and are in fluid communication with the internal passage of the tubes.

Such subassemblies are usually provided to an automotive manufacturer by a vendor specializing in tube manufacture. The sub-assemblies are shipped to the assembly plant in crates. In the vehicle assembly process the tube sub-assemblies must be manipulated into position. Such manipulation requires temporary deflection of the tubes. Toward that end, some assemblies include segmented tubes with flexible coupling sections formed of hose attached in fluid tight relation to the tubes.

Assemblies such as are currently employed have certain undesirable characteristics. First, aluminum tubing is not flexible. It cannot be stressed into a deflected position without permanent damage such as a crimp or kink. The tubes employed, therefore, are usually of a diameter with sufficient strength to endure the manipulations associated with the installation process. As a result they are of excessive capacity for purposes of fluid flow within the system.

Also, use of hose couplings to provide necessary flexibility to the underbody assembly introduces numerous joints which are potential leakage paths. And, attaching separate access ports or connectors to the tubing requires brazing or other manufacturing techniques to affix the connector and tube in a fluid tight manner.

The system of the present invention employs connecting conduit of steel tubing with an outer layer of nylon. Numerous advantages result. First, because of the strength of steel tubing the conduits are made of tubes with smaller diameter creating a more compact underbody assembly that occupies less space. This arrangement also results in a reduction of the refrigerant charge in the cooling portion of the system. Moreover, the inherent resilience of steel tubing permits manipulation into position without flexible joints of hose connected between tube sections. As a result, several potential leakage paths are eliminated.

Another important advantage derived is that joints made between the tube and associated connector elements are sealed by the polymeric coating of the tube. Thus, current attachment configurations including complex end forms or brazed connections are eliminated.

DETAILED DESCRIPTION OF ILLUSTRATED EMBODIMENTS

Figure 1:
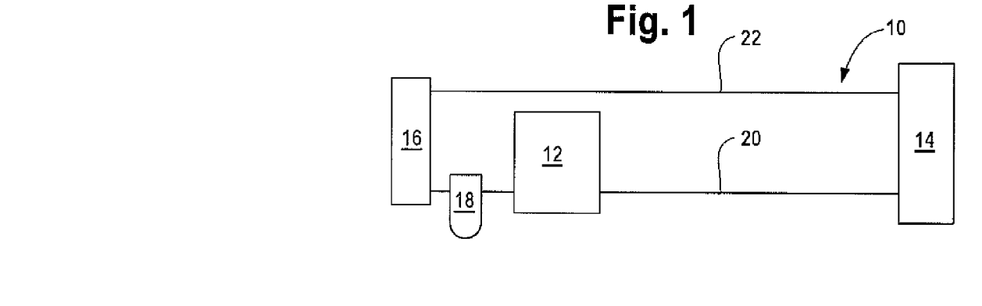
FIG. 1 is a schematic, exemplary of a vehicular climate control cooling system.

Turning now to FIG. 1, there is illustrated a vehicular climate control cooling system generally designated 10 exemplary of the present invention. This schematic is exemplary of a climate control system embodying the present invention. The invention has applicability to heating system components as well.

The illustrated system components include a refrigerant compressor 12, a heat exchanger or evaporator 14, another heat exchanger in the form of a condenser 16, and a liquid accumulator 18. A liquid line or conduit 20 extends between the compressor 12 and evaporator 14. A vapor or gas line or conduit 22 extends between the remaining system elements. The system is a fluid tight closed loop in which is circulated the refrigerant that removes heat from air passing through the evaporator heat exchanger 14, all in a well-known manner.

Figure 2:
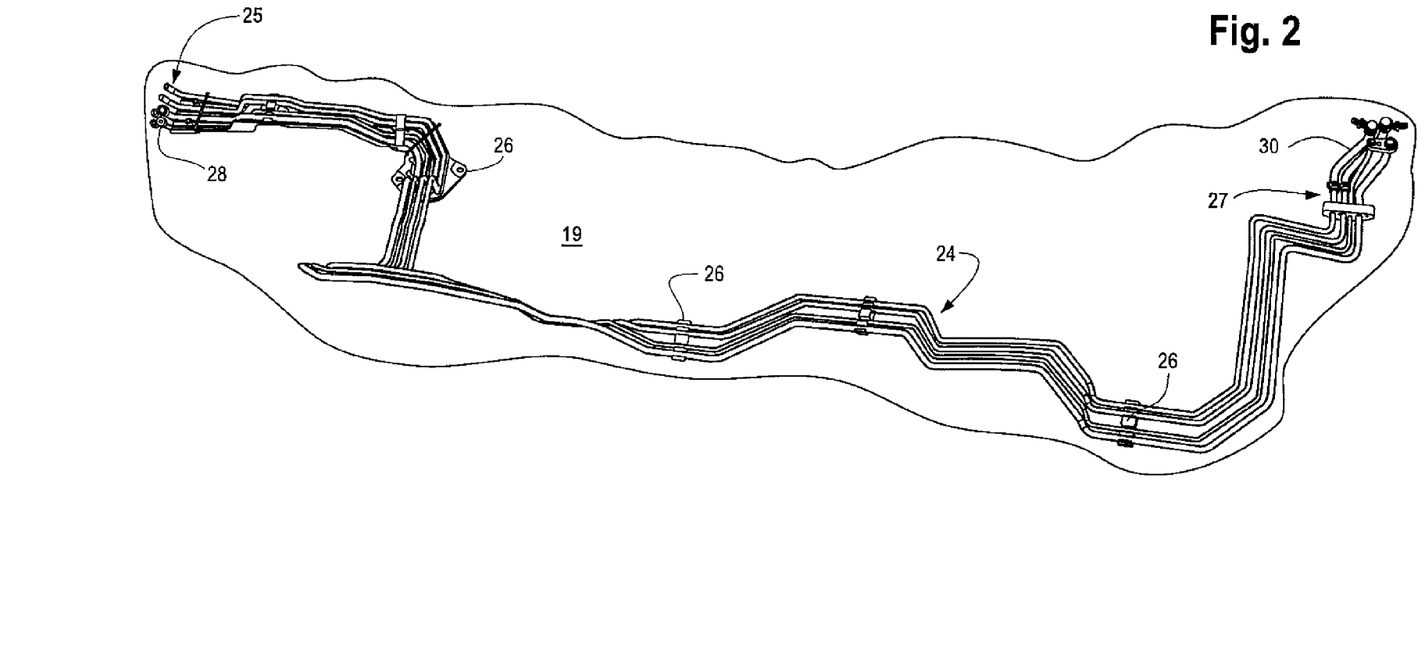
FIG. 2 is a perspective view of an underbody assembly for a vehicular climate control system for heating and cooling.
Figure 3:
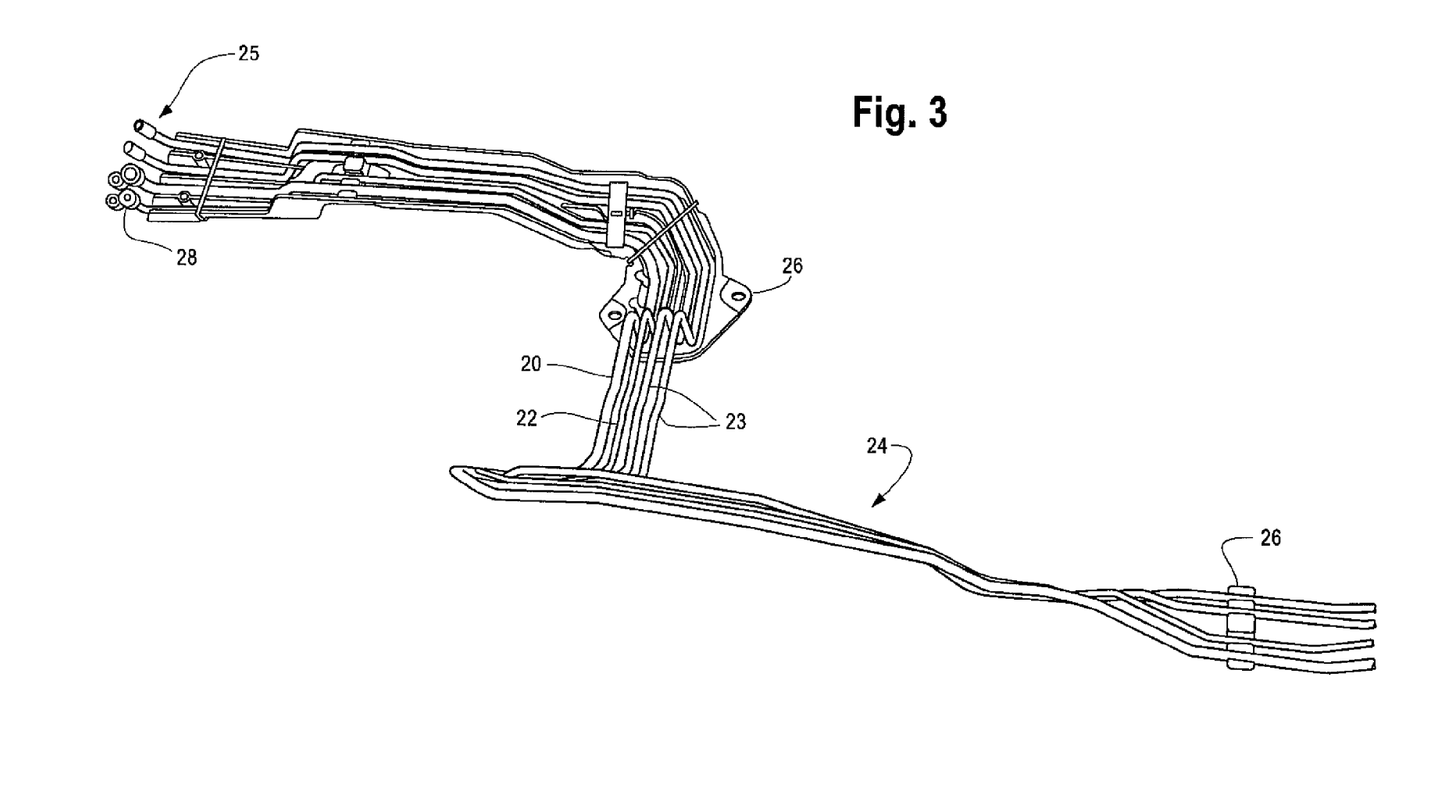
FIG. 3 is a perspective view of a portion of the underbody assembly of FIG. 2.
Figure 4:
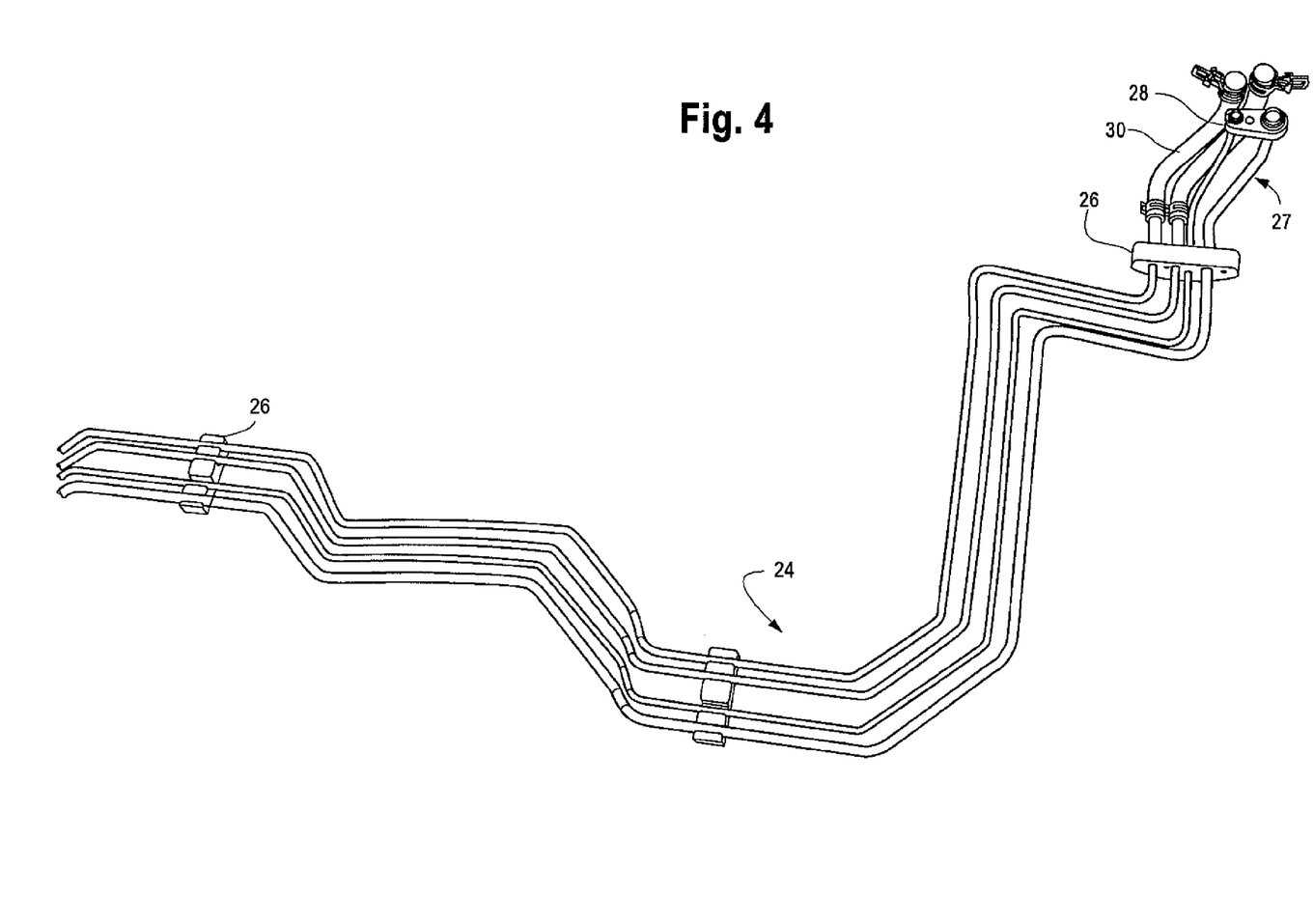
FIG. 4 is perspective view of another portion of the underbody assembly of FIG. 2.

FIGS. 2-4, illustrate an underbody assembly or tubing bundle 24 secured to underbody 19. It includes conduits 20 and 22 and heating system conduits 23 which are configured into elongate bundles 24 of generally parallel conduits secured to mounting brackets 26 which attach the assembly to the underbody 19.

The conduits each define an interior fluid passage. The tubes are rigid and free of any joints or flexible connections between opposite ends 25 and 27. The illustrated bundle includes a liquid line 20, a vapor line 22 and two heating liquid lines 23. The liquid line 20 has an outer diameter that is smaller than the outer diameter of the vapor line 22. The vapor line 22 and the heating system conduits 23 have the same outer diameters. The inner diameter of inner flow passages of the conduits 20, 22 and 23 are similarly related.

The bundles, called an underbody assembly, are provided to automotive assembly plants in the form illustrated. The conduits are of a length that extend from the engine compartment to the rear of the vehicle, rear of the rear wheels. In certain applications, the tube length exceeds ten feet between ends 25 and 27. Each tube includes a mounting block 28 or hose connection 30 for connection to complete the climate control fluid systems of the vehicle during assembly.

Figure 5:
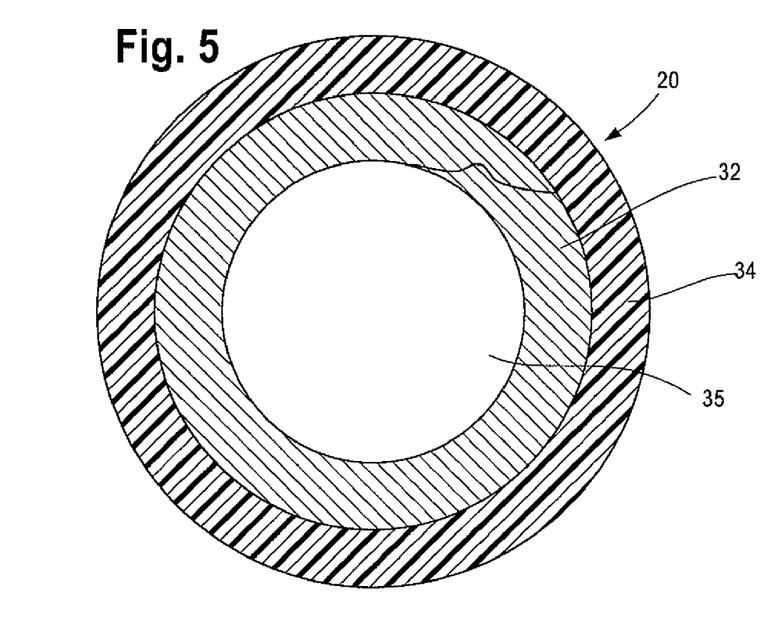
FIG. 5 is a sectional view of the tube employed in the system of the present invention.

The conduit of the systems embodying the present invention is illustrated in cross section in FIG. 5. Each conduit 20, 22 or 23 comprises a hollow steel tube core 32 with a polymeric outer layer 34 bonded to the outer surface of the tube. The tube defines an interior fluid passage 35. A thermoplastic polyamide, such as nylon 12, is considered suitable material. There is usually an intermediate layer such as a chromate primer to prevent corrosion of the steel tube.

The inner steel tube 32 has an outer diameter of 6.35 mm and a wall thickness of 0.71 mm. The nylon coating thickness is 0.170 mm making the overall outer conduit diameter 6.69 mm. By comparison, current automotive climate control systems utilize aluminum tubing for line 20, typically 9.53 mm in overall outer diameter (6 mm or 7 mm inside diameter). The return line 22 is typically 16 to 19 mm in outside diameter (13.5 mm inside diameter) as are the heating liquid conduits 23.

Importantly, the conduits 20, 22, or 23 of the underbody assemblies disclosed here are smaller in overall diameter resulting in a more compact underbody assembly that occupies less space than current arrangements.

A suitable tube to be employed in practicing the principles of the present invention is "NyGal" steel tubing available from TI Group Automotive Systems LLC, Warren, Mich.* It is a rolled steel tube with an other layer of Nylon 12* thermoplastic polyamide.

*NyGal is a registered trademark of TI Group Automotive Systems LLC.
*Nylon 12 is a registered trademark of IE DuPont and DeNemurs Company.

Use of the coated steel tubes in place of the aluminum tube formerly employed provides the advantages of strength at a smaller diameter size thereby conserving on refrigerant necessary to charge the system. Also, the strength and flexibility of the steel tube eliminates the need for flexible hose sections to join tube segments. The conduit 20 is sufficiently flexible to permit manipulation during installation with sufficient "spring-back" to maintain the shape of the sub-assembly.

Figure 6:
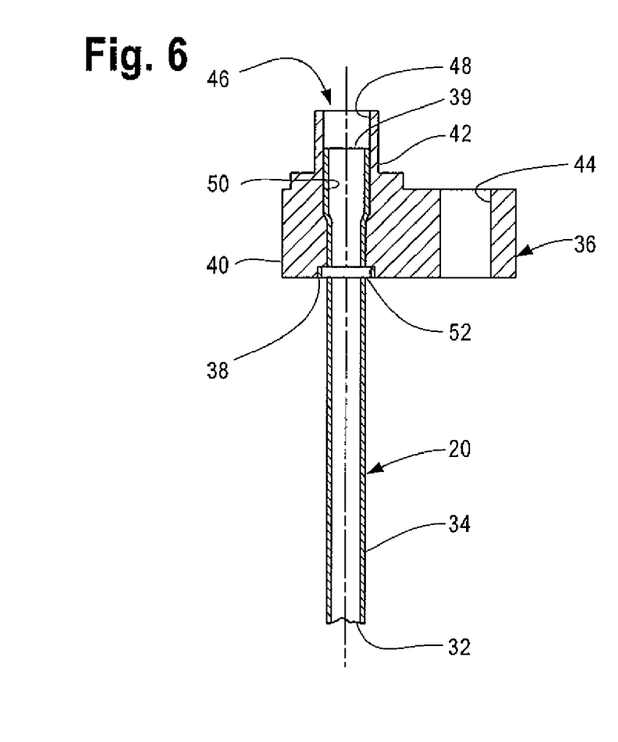
FIG. 6 is a sectional view of a conduit of a system embodying the present invention secured to a coupling block and sealed to the block.

As illustrated in FIG. 6, a conduit such as conduit 20 can be joined to a connector block 36 using the outer nylon layer 34 as a fluid seal. As illustrated, the conduit 20 includes a steel tube core 32 with polyamide outer layer 34. The conduit end is initially formed with a radial upset 38 spaced from its free end 39.

The connector block 36 includes a base 40 with a block fitting pilot 42 for connection to another system component. Hole 44 is provided to receive a fastener (not shown) to secure the block 36 to the system component. A seal (not shown) surrounding the block fitting pilot 42 is interposed between the base 40 at block fitting pilot 42 and the associated surface of a component.

The block base 40 and block fitting pilot 42, define a conduit receiving through bore 46. It includes a large diameter portion 48, larger than the outer diameter of conduit 20, an intermediate portion 50 about the same diameter as the outer diameter of conduit 20 to receive the tube and a surface counter bore 52 at the outer surface of the block.

Conduit 20 is secured to connector block 36, within through bore 46. The free end of the conduit 20 is inserted into the connector block 36 until upset 38 seats in counter bore 52. Conduit 20 extends into intermediate bore portion 50 where it is held in close piloting relation. The free end of the conduit is disposed in the large diameter portion 48 of through bore 46. The free end of the conduit 20 is expanded to conform the free end with the large diameter portion of the through bore and thus captured in the through bore 46 by the upset 38 within counter bore 52 and the expanded free end disposed in large diameter portion 50. The polyamide outer layer 34 of conduit 20 seals against inner surfaces of the bore 46, within large diameter portion 48 and intermediate diameter portion 50 to provide a fluid tight seal between connector block 36 and conduit 20.

Figure 7:
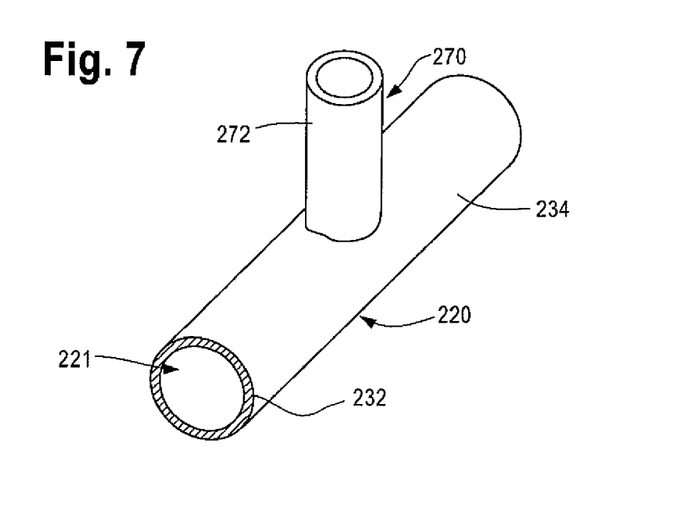
FIG. 7 is a perspective view of a conduit of the system embodying the present invention provided with a branch port or connector with access to the interior fluid flow path of the system.

FIG. 7 illustrates a junction contemplated for the fluid conduits of a vehicular climate control system such as the system 10 using the conduit of the present invention. Such junction can be made using the outer polyamide layer of the conduit to provide a fluid tight joint.

Illustrated is a section of conduit 220 made of a steel tube core 232 and having an outer polyamide layer 234. The tube includes a fluid branch in the form of a hollow connector, or port 270 intended to provide access to the flow passage 221 of tube line 220. The connector end 272 will typically be closed by a removable cap (not shown) or will receive a sensor or other system device that requires access to the fluid within the conduit passage. Though illustrated as attached perpendicular to tube line 220, the connector 270 may be positioned at any convenient or desired angle.

Figure 8:
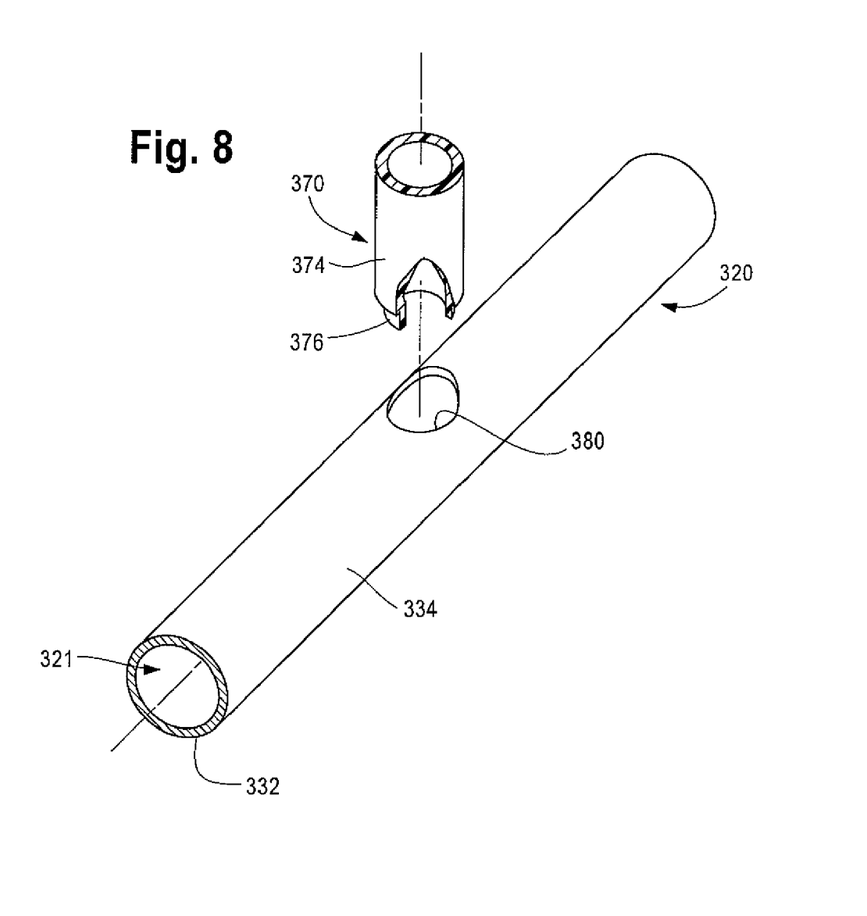
FIG. 8 is an exploded perspective view, partially broken away, illustrating an embodiment of the connector and conduit of the configuration of FIG. 7.

The connector/conduit combination may be made utilizing the components illustrated in FIG. 8. A conduit 320 is illustrated made of steel tube core 332 with an outer polyamide layer 334. A hole 380 is provided through the side wall of the tube which provides fluid communication to the internal fluid passage 321 of the conduit.

A connector 370 is made of thermoplastic polymeric material such as Nylon 12 or thermoplastic material suitable for spin, or friction welding. Connector 370 is hollow includes a tubular portion 374 having an outer diameter larger than the diameter of hole 380. A reduced diameter extension 376 extends from one end of the tubular portion of connector 370. The extension has a diameter larger than the hole 380.

The connector 370 and conduit 320 are joined by a fused butt joint. This is accomplished by positioning the extension 376 over hole 380 and spinning or oscillating the connector 370 relative to the conduit 320. Contact of thermoplastic layer 334 on the tube core 333 and the thermoplastic material of the extension 376 causes melting to join them in a fluid tight relationship possessing sufficient mechanical strength to support the connector 370 on conduit 320.

As an alternative, the connector could be made of machined, cast or forged metal. The extension 376 could be joined to conduit 320 with the use of an adhesive. Induction heating could be employed as an alternative method of joinder. The polymeric layer 334 would melt and form a fluid tight joint.

Figure 9:
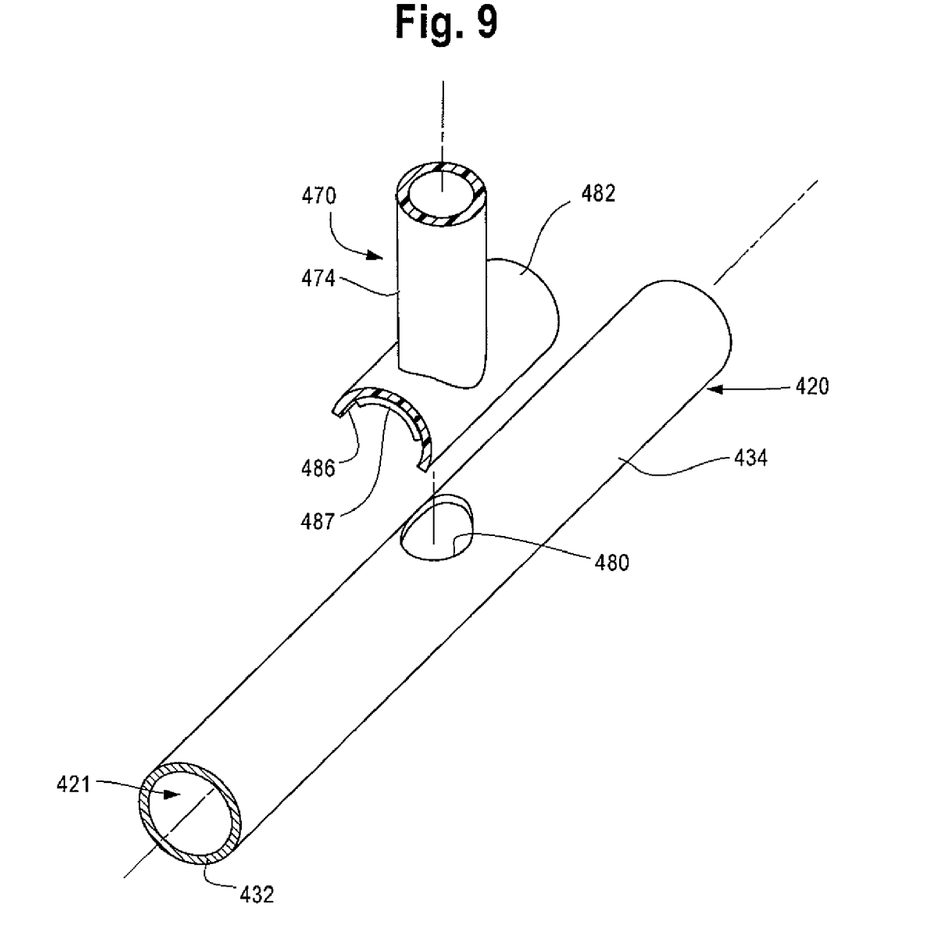
FIG. 9 is an exploded perspective view of another embodiment of the connector and conduit arrangement of FIG. 7.
Figure 10:
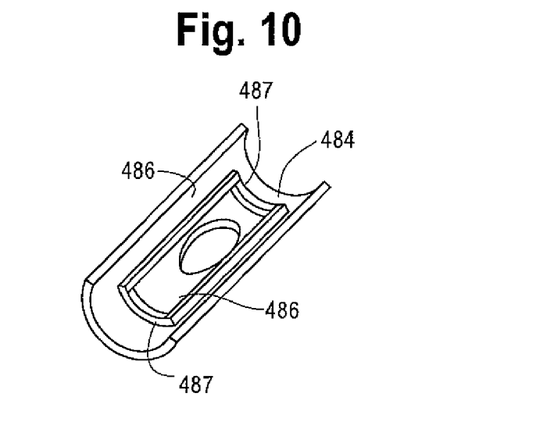
FIG. 10 is a bottom view, in perspective, of a portion of the arrangement of FIG. 9.

A modified form of connector such as shown in FIG. 7 is illustrated in the embodiment of FIGS. 9 and 10. As in the embodiment of FIG. 8, a conduit 420 includes a hole 480 in fluid communication with the central passage 421 of the conduit.

A connector 470 is provided which is formed of polyamide or other thermoplastic material. It includes a hollow tubular portion 474 formed with a mounting plate 482 extending longitudinally of the conduit 420. As best seen in FIG. 10, the plate 482 includes an inner arcuate surface 484 complementary to the outer surface of polyamide layer 432 on steel tube core 434 forming conduit 420. Inner surface 484 includes a pair of raised beads 486 formed of the same thermoplastic material as the connector 470 and mounting plate 482. Bead 486 extends longitudinally of the surface 484. Arcuate transverse beads 487 of the thermoplastic material extend between the longitudinal beads 486.

The connector 470 is secured to the outer surface of conduit 420 by oscillating movement of the connector 470 relative to the conduit. The beads 486 and 487 are melted as is the outer surface of polyamide layer 432 thereby securing the two components in a fluid tight relation. It should be noted that the thermoplastic material contemplated for the connector 470 mounting plate 482 or beads 486 and 487 is not limited to Nylon 12. Any thermoplastic material suitable for spin welding or vibration welding with a compatible melting point would be acceptable.

As another alternate, the outer polymeric layer of conduit 420 and port or connector 470 could be made of IR transparent thermoplastic material. These components could then be laser welded together to form a fluid tight joint. Also, as another alternative, an adhesive could be used to join mounting plate 482 to the outer polymeric layer 434 of conduit 420.

Figure 11:
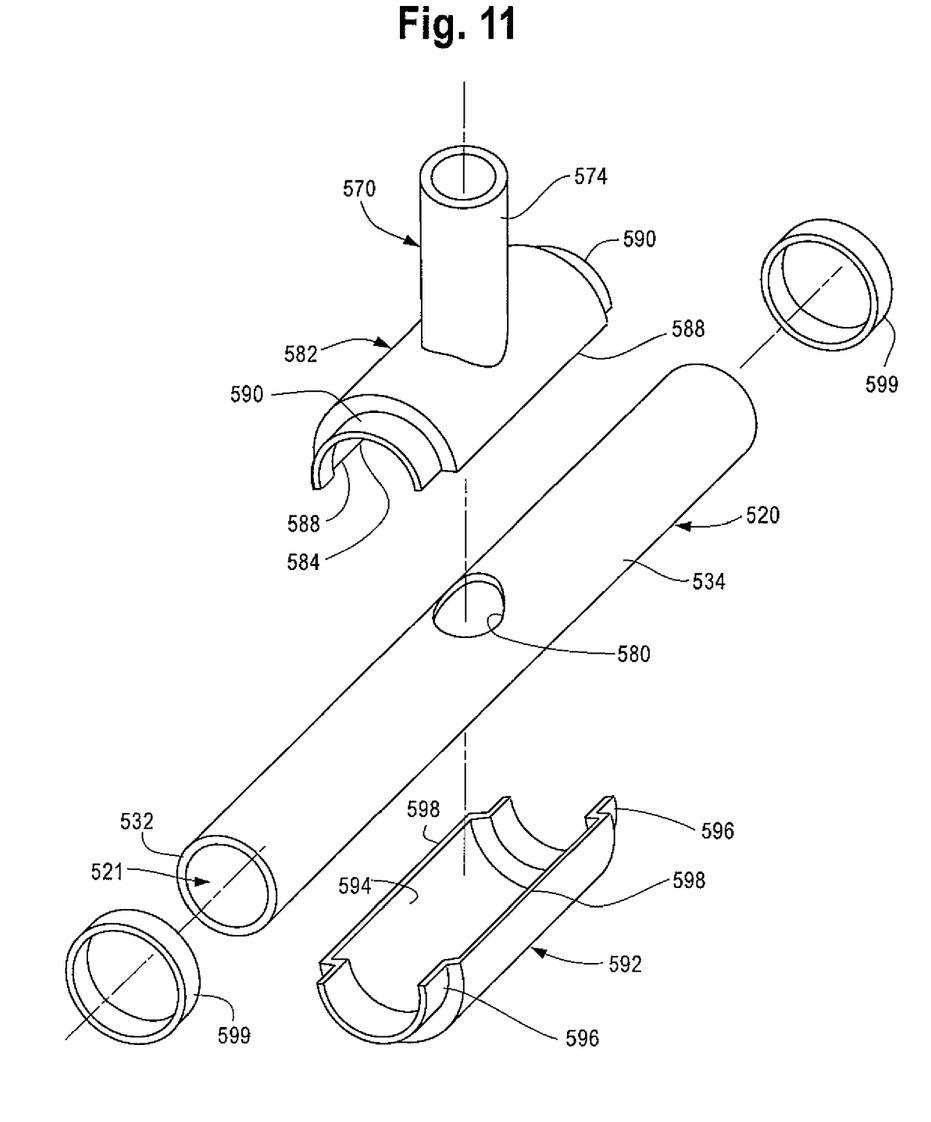
FIG. 11 is an exploded perspective view of another embodiment of the tube and connector arrangement of FIG. 7.

A further modified form of the connector 520 is illustrated in FIG. 11. As in the embodiments of FIGS. 8 and 9, conduit 520 includes a hole 580 in fluid communication with the central passage 521 of the conduit.

A connector 570 is provided which is formed of a thermoplastic material such as polyamide. It includes a hollow tubular portion 574 formed with a transverse mounting plate 582 extending longitudinally of the conduit 520. The plate 582 includes an inner surface 584 with an arcuate shape complementary to the outer surface of polyamide layer 532 on steel tube core 534 forming conduit 520. The inner surface extends from longitudinal edges 588 and is formed on a diameter somewhat larger than the outer diameter of conduit 520.

Each end of mounting plate 582 includes an arcuate flange 590 formed on a diameter complementary to and about the same as the outer diameter of conduit 520.

Connector 520 further includes a separate cap 592 shaped similarly to the mounting plate 582. It includes an inner surface 594 extending between longitudinal edge 590. End flanges 596 are formed on a diameter about the same as the outer diameter of conduit 520. The length of cap 592 between flanges 596 is such that the flanges 596 align with flanges 590 of mounting plate 582, with longitudinal edges 598 in facing relation to longitudinal edges 588 of mounting plate 582.

A metal ring 599 is associated with each pair of flanges 590 and 596. It surrounds the outer surfaces of the flanges to clamp them to the outer surface of the conduit 520.

It is contemplated that the metal rings can be crimped to affix the mounting plate 582 and cap 592 to the conduit in overlying relation to the hole 580 in conduit 520 in fluid tight relation to the polyamide outer layer 534. The aligned edges 588 and 598 of the mounting plate 582 and cap 592 can be laser welded or induction welded to form a fluid tight joint.

Figure 12:
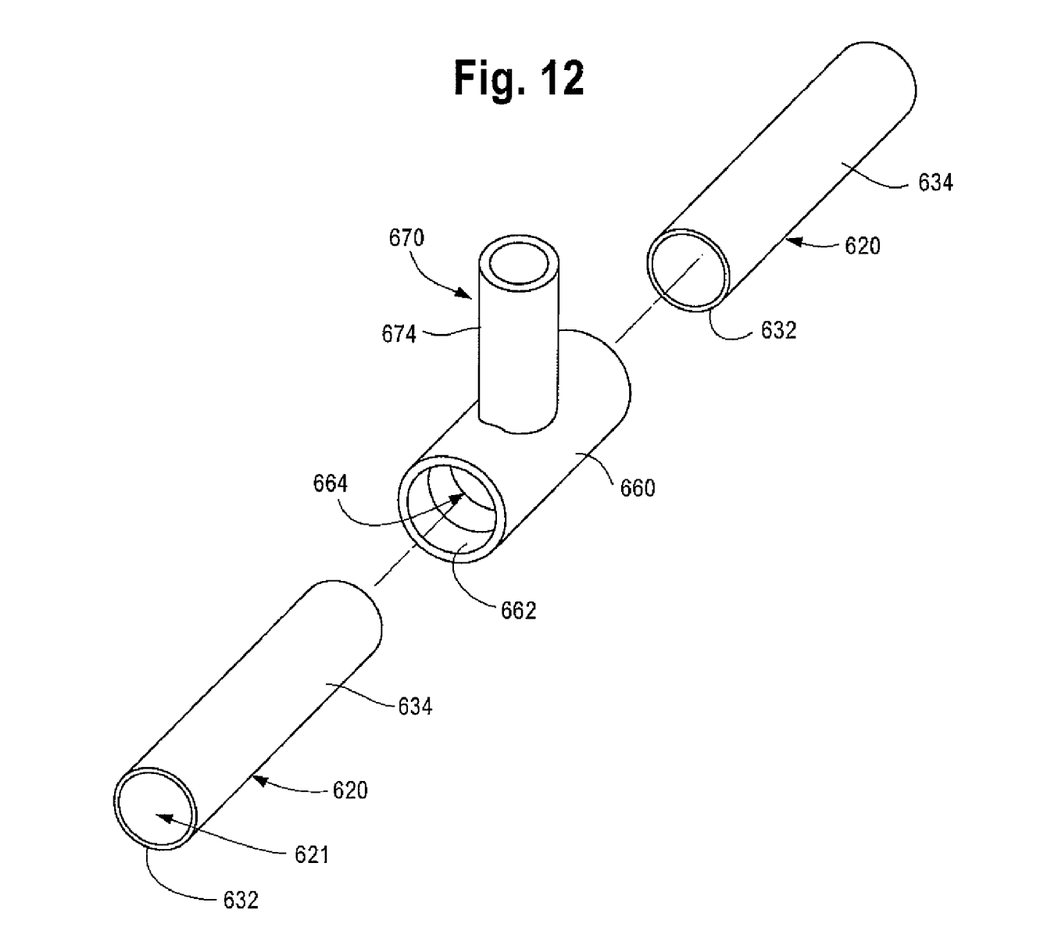
FIG. 12 is an exploded view of yet another embodiment of the conduit and connector arrangement of FIG. 7.

A modified form of connector is disclosed in the embodiment of FIG. 12. A connector 670 is provided which is formed of polyamide or other thermoplastic material. It includes a central hollow longitudinal portion 660 defining a central passage 664 with opposite end portions defining conduit receiving bores 662 to receive sections of conduit 620. A tubular portion 674 extends from the longitudinal portion 660. It is hollow and defines a passage 621 in fluid communication with passage 664 of longitudinal portion. As in other embodiments, it is illustrated as being perpendicular to the longitudinal extent of the tube. Of course, it may be positioned at any desired angle.

The conduit 620 is formed of two separate sections of steel tube core 632 having a polyamide outer layer 634. An end of each separate conduit portion 620 is inserted into each tube conduit receiving bore 662. The bores are sized to receive the conduit end such that spin welding of conduit 620 to the connector 670 is accomplished by well known spin welding techniques.

The connector 670 could also be made of machined, cast or forged metal. In such and instance a joinder could be accomplished by crimping conduit receiving portions 662 onto the ends of conduit 620. The polymeric outer layer 634 provides a fluid tight seal.

The ends of conduit 620 could also be attached to connector 670 using the joint and method disclosed in U.S. Pat. No. 6,367,850 the specification and drawings of which are hereby incorporated by reference.

Various features of the invention have been shown and described in connection with the attached drawings. It must be understood, however, that modifications may be made without departing from the scope of the invention.

The invention claimed is:

1. A conduit for a climate control system for an automotive vehicle comprising:
    a rigid steel tube defining an interior fluid passage, said tube including an outer layer of polymeric material; and
    wherein said tube includes at least one hole therethrough communicating with said interior fluid passage, a fluid branch formed of polymeric material disposed at an angle to a longitudinal axis of said tube, said fluid branch is connected to said tube in fluid communication with said interior fluid passage defined by said tube through said hole and said connection is sealed by said polymeric material of one of said outer layer and said fluid branch; and
    wherein said fluid branch includes a tubular portion surrounding said hole in said tube, and said fluid branch is joined to said tube in fluid tight sealing relation; and
    wherein said fluid branch includes a reduced diameter extension disposed in said hole in said tube with said hole surrounding the reduced diameter extension and with said extension and the outer layer of said tube defining a fused butt joint.

2. A conduit for a climate control system as claimed in claim 1 wherein said tube is continuous between opposite ends, free of any joints or flexible connections.

3. A conduit for a climate control system as claimed in claim 2 wherein said polymeric material is polyamide.

4. A conduit for a climate control system as claimed in claim 3 wherein said polyamide is nylon 12.

5. A conduit for a climate control system as claimed in claim 4 wherein said tube is at least ten feet in length.

6. A conduit as claimed in claim 5 wherein said conduit includes a connector at at least one end and said conduit is a continuous tube free of any joints or flexible connections.

7. A conduit as claimed in claim 5 wherein said conduit includes a hose connection at at least one end.

8. A fluid conduit as claimed in claim 6 wherein said tube includes a radial annular upset spaced from a free end thereof, said connector defines a through bore having a counter bore at one end sized to receive said upset, an enlarged portion at an opposite end having a diameter larger than the diameter of said tube and a central portion sized to receive said tube, said tube disposed in said central portion with said upset seated in said counter bore, said free end disposed in said enlarged diameter portion of said tube and expanded to conform to said enlarged portion of said through bore to secure said connector to said tube.

9. A conduit as claimed in claim 1 wherein said fluid branch includes a polymeric mounting plate extending longitudinally of said tube, said mounting plate includes an inner arcuate surface complementary to the outer surface of said polymeric layer of said tube and said fluid branch is secured to said tube by melted polymeric material of at least one of said outer layer of said tube and said mounting plate of said fluid branch.

10. A conduit as claimed in claim 9 wherein said arcuate surface of said polymeric mounting plate includes beads of polymeric material extending longitudinally and transversely of said mounting plate and said mounting plate is sealed to said outer layer of said tube by melted polymeric material of at least one of said outer layer of said tube and said beads.

11. A conduit for a climate control system for an automotive vehicle comprising:
a rigid steel tube defining an interior fluid passage, said tube including an outer layer of polymeric material;
wherein said tube includes at least one hole therethrough communicating with said interior fluid passage, a fluid branch formed of polymeric material disposed at an angle to a longitudinal axis of said tube, said fluid branch is connected to said tube in fluid communication with said interior fluid passage defined by said tube through said hole and said connection is sealed by said polymeric material of one of said outer layer and said fluid branch;
wherein said fluid branch includes a tubular portion surrounding said hole in said tube, and said fluid branch is joined to said tube in fluid tight sealing relation;
wherein said fluid branch includes a polymeric mounting plate extending longitudinally of said tube, said mounting plate includes an inner arcuate surface complementary to the outer surface of said polymeric layer of said tube and said fluid branch is secured to said tube by melted polymeric material of at least one of said outer layer of said tube and said mounting plate of said fluid branch;
wherein said mounting plate includes opposite ends defining arcuate flanges having an arcuate shape generally complimentary to the outer diameter of said outer layer of said tube, and a separate cap shaped similarly to said mounting plate having end flanges similar to said end flanges of said mounting plate, said mounting plate and said separate cap with arcuate inner surfaces between said flanges having a diameter larger than the diameter of said outer layer of said tube and mating longitudinal edges in facing relation to each other, said end flanges secured to said outer polymeric layer of said tube and said mating longitudinal edge welded together to form a fluid tight joint.

12. An underbody assembly of fluid conduits for a vehicle climate control system including:
a plurality of tubes each defining a fluid passage, at least one of said tubes being a steel tube and said steel tube including an outer polymeric layer; and
wherein said steel tube includes at least one hole therethrough communicating with said interior fluid passage, a fluid branch formed of polymeric material disposed at an angle to a longitudinal axis of said steel tube, said fluid branch is connected to said steel tube in fluid communication with said interior fluid passage defined by said steel tube through said hole and said connection is sealed by said polymeric material of one of said outer layer and said fluid branch; and
wherein said fluid branch includes a tubular portion surrounding said hole in said tube, and said fluid branch is joined to said tube in fluid tight sealing relation; and
wherein said fluid branch includes a reduced diameter extension disposed in said hole in said tube with said hole surrounding the reduced diameter extension and with said extension and the outer layer of said tube defining a fused butt joint.

13. An underbody assembly of fluid conduits as claimed in claim 12 wherein said tubes are continuous between opposite ends free of any joints or flexible connections.

14. An underbody assembly of fluid conduits as claimed in claim 13 wherein said tubes are joined together by mounting brackets.

15. An underbody assembly of fluid conduit as claimed in claim 14 wherein at least a portion of said tubes include a connector at at least one end thereof.

16. An underbody assembly of fluid conduit as claimed in claim 14 wherein:
at least a portion of said tubes includes a hose connection at at least one end thereof.

17. An underbody assembly of fluid conduit as claimed in claim 14 wherein said tubes are at least ten feet in length between opposite ends.

18. An underbody assembly of fluid conduit as claimed in claim 17 wherein one of tubes has an outer diameter that is smaller than the outer diameter of at least one other of said tubes.

19. An underbody assembly of fluid conduit as claimed in claim 13 wherein said polymeric material is polyamide.

20. An underbody assembly for fluid conduit as claimed in claim 19 wherein said polymeric material is nylon 12.

* * * * *